United States Patent [19]

Heimerl

[11] 3,748,070

[45] July 24, 1973

[54] APPARATUS FOR PREPARING PELLETS FROM A MELT

[75] Inventor: Joseph Heimerl, Altenhasslau, Germany

[73] Assignee: Leybold-Heraeus Verwaltung GmbH, Koln-Bayental, Germany

[22] Filed: July 12, 1971

[21] Appl. No.: 161,847

Related U.S. Application Data

[62] Division of Ser. No. 124,330, March 15, 1971.

[30] Foreign Application Priority Data

Feb. 26, 1971 Germany.................. P 20 12 213.8

[52] U.S. Cl........................ 425/6, 425/210, 264/15, 264/25
[51] Int. Cl. .......................................... B29c 23/00
[58] Field of Search........................... 425/210, 6, 7; 264/13, 25, 40, 9, 5

[56] References Cited
UNITED STATES PATENTS
3,646,175  2/1972  Bomberger, Jr. et al. .............. 264/8

Primary Examiner—Robert L. Spicer, Jr.
Attorney—Joseph F. Padlon

[57] ABSTRACT

Auxiliary improved apparatus operable under a vacuum or under a blanket of an inert gas, wherein a melt container is provided accommodating a molten liquid metal under the influence of at least one generator for electrically charged particles, having means dividing the melt into two areas so as to prevent imbalence in the melt, and moving means for collecting the resultant refined metal droplets from the container.

5 Claims, 3 Drawing Figures

Patented July 24, 1973
3,748,070
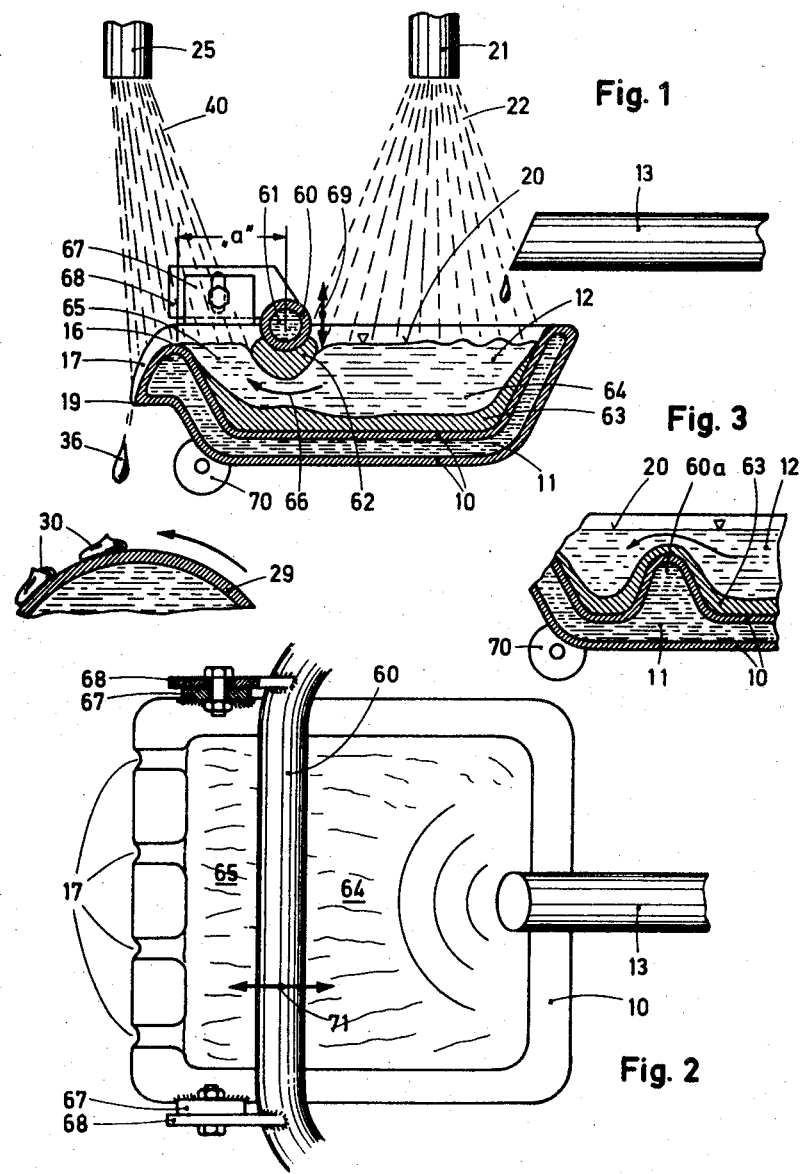

APPARATUS FOR PREPARING PELLETS FROM A MELT

RELATED U.S. APPLICATION

This is a division of copending application Ser. No. 124,330, Filed Mar. 15, 1971, by Waldemar Russ and Herbert Stephan, assigned to Ley-Bola-Heraeus Verwaltung GMBH,K81n-Bayental, Germany.

The invention relates to an arrangement for preparing pellets by melting starting materials in a vacuum or under a protective inert gas and by subsequently solidifying individual melt drops, consisting of at least one generator for electrically charged particles, a feeding device, a melt container with dripping arrangement, and a cooling surface which is located underneath the dripping arrangement.

In the forementioned patent application metal is melted and collected in a melt container and is fed in the form of drops to a moving cooling surface by means of a dripping arrangement located on the melt container. On the cooling surface, the drops are solidified to pellets and then removed. It was demonstrated in the previous application that using a special melt container for the melted material before it reaches the cooling surface has considerable advantages as to the uniformity of the prepared pellets and to the useful life and reliability of the installation.

It is an object of this invention to further improve the arrangement described in the principal application hereinabove mentioned. It was found that occasional difficulties had to be expected during non-uniform operation of the apparatus on account of the molten metal in the melt container. Difficulties are caused, for example, by a non-uniform charging of the melt container, the effect being enhanced by an unavoidable, physical property of the melt, referred to as surface tension. Moreover, the liquid content of the melt container tends to oscillate due to various reasons, which may include an intended oscillation of the melt container to lower the surface tension.

It is the object of the invention to hold the dripping rate and the amount of melt withdrawn from the melt container per unit time as constant as possible. Since the dripping rate depends mainly on the amount of the material overflowing from the container, and that amount again depends on the location of the liquid level, it is evident that the liquid level must be controlled within very narrow limits. This implies that if the withdrawal of the molten material is uniform, the addition of the same also is uniform.

But the feeding rate of the material cannot be kept completely constant on account of unavoidable tolerances in the dosing arrangement. If the melt container is charged with pieces of scrap, it is, for example, unavoidable that the pieces of scrap are of different sizes. If the container is charged by means of a melting electrode made of compressed scrap, it is apparent that variations in the feeding rate of the molten material will also result from unavoidable non-homogeneity in this melting electrode. If, per unit time, a larger amount of material is fed to the melt container than the corresponding average withdrawal per unit time, then the melt level rises somewhat. If the material is charged batchwise, a wave front is also formed which tends to expand evenly on the melt surface.

To recognize the consequences of non-uniform operation, one has to consider the physical events during formation of a drop by overflowing of a container. If the liquid level of a container rises, a meniscus is formed due to the surface tension characteristics of the container contents. If the meniscus exceeds a certain size, or if some other disturbance is initiated, a part of the material inside of the meniscus flows off. It is characteristic of such an operation that not only as much material flows off as is necessary to restore the original state of equilibrium, but that the overflow process, once it is started, continues until the meniscus contains much less liquid than shortly before starting of the overflow. As a result, the first overflowing drop drags a continuous run of the melt behind itself. If the cooling surface on which the drop is to be solidified to a pellet is that of a rotating roller, then a string of solidified melt is wrapped about the roller and cannot be released, whereby the pellet-forming process is blocked.

It is, therefore, an object of the invention to eliminate the afore-described disadvantages and to provide an arrangement which makes possible an operation free of disturbances and a simultaneous manufacture of substantially uniform pellets, regardless of the precision and care used in charging the melt container. This object is achieved by providing the melt container with a cooling body within the effective range of the melt surface, whereby the melt puddle may be divided into zones. The material feeding area may be located on one side and the dripping arrangement on the other side of the cooling body.

The term "within effective range of the melt surface" is not to be interpreted so narrowly that the melt surface and the cooling body are located in a common horizontal plane. It is also possible that the cooling body is constituted by a toroidal elevation on the bottom of the melt container, the elevation extending across the flow direction of the melt to near its surface. It is especially advantageous, however, if the cooling body is a pipe through which a cooling liquid flows, and whose axis is parallel to the melt surface and extends across the flow direction of the melt. An additional advantage arises from a cooling pipe arranged across the flow direction and thereby parallel to the dripping arrangement, as will become apparent presently, if the distance "$a$" of the cooling body from the dripping arrangement is adjustable.

The improved arrangement of the invention operates as follows: Due to the subdivision of the melt container into different zones a narrow passage is formed in the flow path and exerts a damping effect on instabilities, especially in the area of the melt surface. If the dripping rate and the material feeding rate are constant, the content of the melt container moves very slowly from the feeding area to the dripping arrangement. In this case, the resistance of the restricted flow section is minimal. With sudden fluctuations of the material feeding rate, however, the disturbance is transmitted at first only to the cooling arrangement. If the melt surface is interrupted by a pipe-shaped cooling body, then wave-like disturbances are brought to a standstill at the latest at this point. The amounts of melt present in the divided melt container in the individual zones form unitary bodies capable of oscillations at an amplitude and frequency which is substantially smaller than in a melt container not so divided. It thus becomes possible to provide the melt container with an oscillation generator by means of which vertical oscillations are forced on the melt container, for example, about a pivot axis. Such vibrations reduce the surface tension and favor the formation of individual smaller drops and corresponding pellets.

The cooling body of the invention also preferably forms a dividing line between zones of the melt puddle heated to different surface temperatures by beams of electrically charged particles. The zone of the melt container to which material is being fed may be heated, for example, to a higher temperature which in the case of melting titanium may be between 1,800°–2,000°C, whereas the dripping zone adjacent to the dripping arrangement may be adjusted to a lower temperature, for example of 1,700°–1,800°C.

Immediately adjacent the dripping trough the melt may be overheated locally by an aimed beam. The differential heating of the melt makes it possible to control the size of the drops by the dropping rate in a desired manner. At a higher melt temperature, the surface tension is reduced and the drop size is decreased and vice versa.

As has been pointed out above, it is advantageous to make distance "a" between the cooling body and the dripping arrangement adjustable. This further permits controlling the drop size and dripping rate, the cause again being found in the connection between the surface temperature, the surface tension, oscillating characteristics, oscillating frequency, and the amount of liquid extending above the overflow (meniscus). Although the connections are extremely complex in nature the desired effect is achieved by simple testing and varying individual parameters.

It is an outstanding effect of the apparatus of the invention that the formation of long melt runs from a single melt drop can be prevented under odd operating conditions with great reliability, and such runs cannot be wound on a cooling drum in thereby interrupting operations.

A preferred embodiment of the invention and of its operation will be described hereinafter in conjunction with the accompanying drawings in which:

FIG. 1 shows the essential elements of an apparatus in cross-section, apparatus including a melt container with a cooling body, a generator for charged particles, and a cooling surface;

FIG. 2 is a top plan view of the melting container with cooling body taken on line 2—2 of FIG. 1; and FIG. 3 shows a melt container having a cooling body arranged in the bottom zone in cross-sectional view.

In FIG. 1 a double walled melt container 9 is pan shaped whose jacket is provided with a stream of cooling medium 11, fed thereinto by suitable means. The melt container is filled with a melt puddle 12, in this instance as an example, titanium, to the lowest point of its rim. A feeding arrangement for the bar shaped starting material 13 is, not shown in the drawing for the sake of simplicity, and also is known in this art. It is arranged above the melt container and laterally outside the rim of the same, as shown in the drawings. The rim of the melt container has a depression or lip 16 at one side which is extended by a dripping trough 17. The trough is a portion of an inclined plane and ends at its lowest point in a dripping nose 19.

Within effective range of the melt level 20, a cooling body 60 is arranved over the entire length of the melt container 10 at right angles to the plane of the drawing. The interior of the pipe shaped cooling body is filled by a circulating cooling liquid 61. Cooling body 60 consists of copper, with a layer 62 of solidified metal, titanium, deposited on the underside of cooling body 60 during operation or use of the latter. The same structure can also be found on the inner wall of melt container 11 on which a solidified layer 63 of initially molten metal is formed. Such solidified layers are commonly referred to in the art as "skull."

The melt puddle 12 is divided by cooling body 60 in the melt container 10 into two zones 64 and 65 respectively, which communicate with each other through a gap between layers 62 and 63. The material fed to the container is molten in the zone 64, and the melt withdrawn in the form of drops 36 taken directly from the zone 65. A weak flow current forms in the direction of the arrow 66. The distance "a" of cooling body 60 from depression or lip 16, whereby the volume of material in the zone 65 is adjustable. A lug 67 is provided for this purpose on melt container 10 and a lug 68 on the cooling body 60, the lugs being connected by elongated openings. Said openings are chosen in such a manner that it is possible to shift the cooling body both in horizontal direction as well as in vertical direction as indicated by the arrow 69. Electron beam generator 21 is mounted above zone 64 and produces a fully accelerated focussed electron beam 22 over the zone 64. Said electron beam generator 21 is further provided with a non illustrated device for periodically deflecting the electron beam, whereby it is possible to scan the entire surface of the melt in the zone 64. Since details of the electron beam generator are known in the art it is not believed necessary to describe it in more detail here.

The dripping trough and nose 19 jointly constitute the dripping arrangement. A further electron beam generator 25 in spaced relation to the trough is associated with the dripping arrangement and the melt in the zone 65 and is of the same construction as generator 21. Generator 25 essentially scans trough 17 and the portion of the melt surface up to the cooling body 60. A liquid-cooled cooling surface 29 having the shape of a rotating roller such as shown in the aforementioned copending application is located vertically below the dripping nose 19. The cooling surface 29 moves in response to the drop frequency of the drops 36 at such a rate that these drops impinge on the roller forming solidified pellets barely miss touching each other on the roller. The oscillating movement of the melt container 10 is achieved by means of a rotating eccentric disc 70 on which the melt container rests by means of an abutment, not shown in detail.

The same details are indicated in FIG. 2 with the same reference numerals. Melt container 10 is provided with four equal troughs 17 juxtaposed in a row. Cooling body 60 is parallel to this row and may be shifted in the direction of the arrow 71 while maintaining its parallel relationship to the troughs. The entire zone 65 between the cooling body and the end of the trough 17 is impinged upon by electron beams 40 from electron gun 25.

In FIG. 3 is shown a section of the melt container 10 illustrated in FIG. 1, modified in such a manner that the cooling body is located at the bottom of the melt container. Said cooling body 60a in this case is constituted by a bulge-like projection of the upper wall of the melt container 10 which consists of copper. The projection extends over the entire area of the metal melt transversely to the direction of flow in a manner analogous to the tubular cooling body 60 in FIG. 1. The construction is simplified by the fact that the cooling medium 11 located in the melt container simultaneously assumes the function of cooling the cooling body 60a.

I claim:

1. Apparatus for preparing pellets by melting a starting material in a protective atmosphere and by subsequently solidifying individual drops of the melt, comprising at least one generator of beams of charged particles, a feeding device, a melt container under the range of the generator provided with a dripping arrangement, and a cooling surface located below said dripping arrangement characterized in that said melt container is provided within effective range of the melt surface, a cooling body for said melt container, and means dividing the melt puddle into two zones, said material being fed to one side of the cooling body and the dripping arrangement being located on the other side thereof.

2. Apparatus according to claim 1, wherein said cooling body is a cooling pipe with cooling liquid flowing through said pipe, the axis of the pipe being parallel to the surface of the melt and transverse to the direction of melt flow, said pipe being at least partly wetted by the melt.

3. Apparatus according to claim 2, characterized in that a distance "$a$" of the cooling body from the dripping arrangement is capable of adjustment.

4. Apparatus according to claim 1, characterized in that a bulge-shaped projection is located on the bottom of the melt container and passed by a cooling medium the projection extending transversely to the flow direction up to adjacent highest possible level of liquid.

5. Apparatus according to claim 1, wherein there is a plurality of generators disposed above the melt container and being in spaced relation with each other, and said melt container having a grooved exit portion to permit the resultant melt to exit therefrom in the form of molten metal droplets, and cooling rotating means for collecting said droplets.

* * * * *